Dec. 8, 1942.                I. H. BEAMAN                 2,304,726
              INDICATING MECHANISM FOR PAINT STRIPING MACHINE
                    Filed Oct. 31, 1940          2 Sheets-Sheet 2
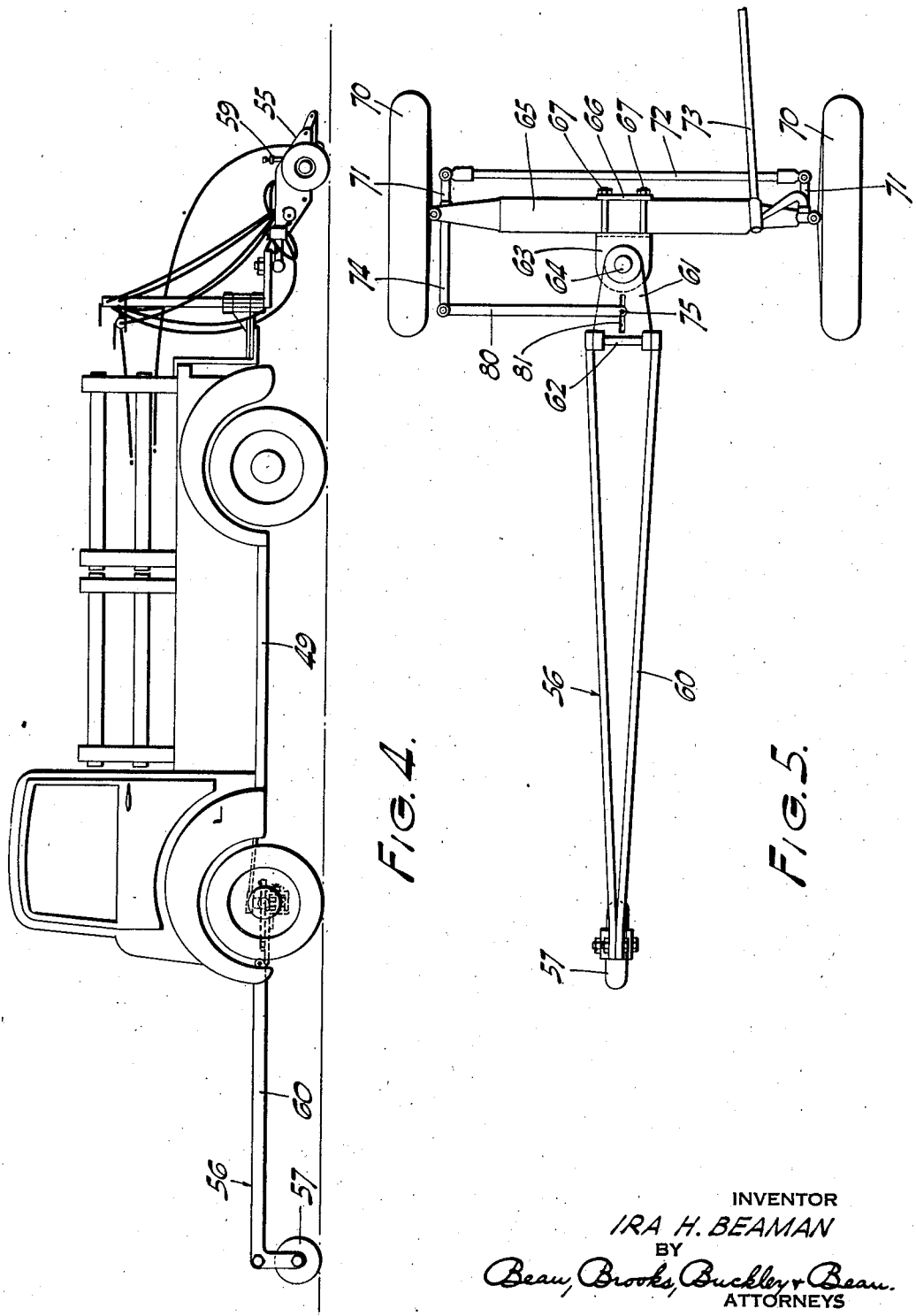
INVENTOR
*IRA H. BEAMAN*
BY
*Beau, Brooks, Buckley & Beau.*
ATTORNEYS Patented Dec. 8, 1942

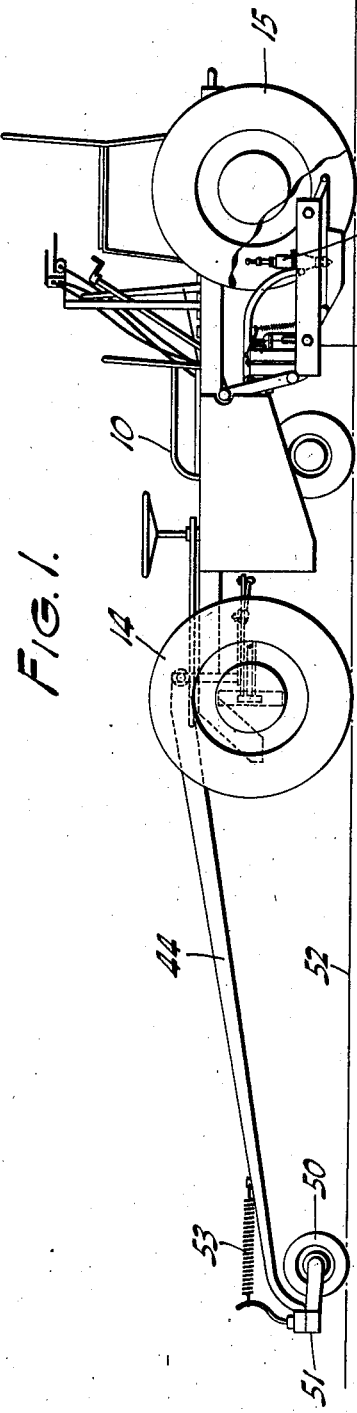
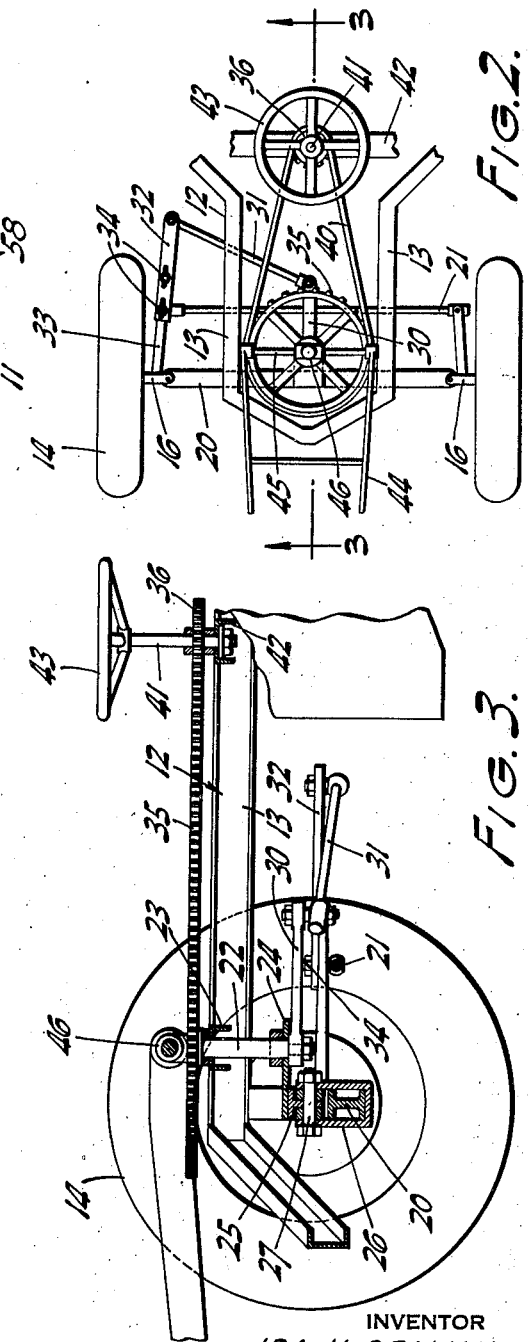

2,304,726

UNITED STATES PATENT OFFICE 2,304,726

INDICATING MECHANISM FOR PAINT STRIPING MACHINES

Ira H. Beaman, Buffalo, N. Y., assignor of one-half to Burnwell Corporation, Buffalo, N. Y., a corporation of New York Application October 31, 1940, Serial No. 363,687

8 Claims. (Cl. 280—87)

It is well known to those skilled in the art that the traffic lane markings on the pavements of state and county highways need to be renewed owing to wear caused by traffic and natural disintegration of the paint used. It is also well known that whether the paint striping device used is towed by means of a truck or is mounted upon a pushmobile arranged in front of a truck, it is very difficult to so steer the vehicle as to follow the previously striped line or the markings or indications placed upon a road not yet striped, with the result that not only is the operator likely to produce a wavy stripe, but only portions of the previously painted stripe will be covered with new paint, which is very objectionable. Particularly it is difficult to register a newly painted stripe with an old stripe or with previously made marks which are upon a curved part of the roadway since, as is well known, it is necessary particularly with the truck-propelled striping device to guide the truck in offset relation with the old stripe or marking in order that the new stripe may be applied in the proper place.

The principal object of my invention has been to provide indicating means for the steering devices of paint striping machines having a tracing wheel which is extended forwardly a considerable distance ahead of the truck or pushmobile and which magnifies the movement of the steering mechanism of the vehicle so that the steering thereof may be very accurately and sensitively controlled, whereby the newly painted stripe may be very accurately positioned.

Another object has been to provide an indicating device having a forwardly extending boom and means connecting said boom with the steering mechanism of the vehicle whereby angular movements of the boom caused by the movements of the steering means are greatly magnified relative to the movements of the steering means so that the vehicle may be very accurately steered.

A further object of my invention has been to provide an adjustable connection between the steering boom and the steering mechanism of the vehicle, whereby the ratio of movement of the tracing wheel carried by the boom and the movement of the steering wheels of the vehicle may be varied.

Moreover, my invention when applied to a truck does not in any wise alter the construction of the steering mechanism of the truck and may be applied to or removed therefrom at will.

The above objects and advantages have been accomplished by the device shown in the accompanying drawings, of which:

Fig. 1 is a side elevation of my invention as applied to a pushmobile.

Fig. 2 is a plan view thereof.

Fig. 3 is an enlarged, sectional view taken on line 3—3 of Fig. 2.

Fig. 4 is a side elevation of a modified form of mechanism as applied to a truck.

Fig. 5 is an enlarged, fragmentary, plan view of the form of invention shown in Fig. 4.

Referring now particularly to the invention shown in Figs. 1 to 3, inclusive, 10 is a road striping machine of the pushmobile type having a painting device 11 suspended therefrom. This pushmobile is formed with a chassis 12 having side members 13. Front supporting wheels 14 and rear supporting wheels 15 are suitably mounted upon the chassis for supporting the machine. The front supporting wheels 14 are the steering wheels of the device and are mounted upon the usual steering knuckles 16 carried by the front axle 20 of the device. The steering knuckles are connected together in customary manner by means of a connecting rod 21.

Carried at the front end of the chassis is a vertically arranged steering shaft 22 which is rotatably supported at its upper end by a cross bar 23, extending from one side member 13 of the chassis to the other, and at its lower end by means of a bearing plate 24, which is carried by the axle 20 and preferably secured to a T-shaped member 25, clamped in position upon the axle by means of a clamp 26 and a bolt 27. The lower end of the steering shaft 22 has a steering lever 30 non-rotatably attached thereto. This arm preferably extends rearwardly and is connected to an adjustable steering arm 32 by means of a drag link 31. The steering arm 32 is adjustably secured to the steering knuckle arm 33 by means of bolts 34 and is designed to have sliding engagement therewith when being adjusted, whereby the effective length of the steering arm may be adjusted. Rigidly mounted upon the upper end of the steering shaft 22 is the steering sprocket wheel 35 of my device. This steering sprocket wheel is connected to a sprocket wheel 36, carried by a wheel shaft 41, by means of a chain 40. The sprocket wheel 36 is rigidly mounted upon the wheel shaft 41, which is rotatably carried by the cross member 42 of the chassis. Also rigidly carried by the shaft 41 is a steering wheel 43. By means of the steering wheel 43 the steering shaft 22 may be operated to cause the front supporting wheels 14 to be operated to steer the vehicle.

My device is provided with an indicating boom 44 which extends forwardly beyond the pushmobile. The rear end of the boom is pivotally mounted upon a rod 45 which is carried by a T-shaped member 46 rigidly mounted upon the upper end of the steering shaft 22, whereby the boom is controlled in its movements by the steering shaft. The rear end of the boom is flared outwardly where it engages the rod 45 and converges at its forward end where it is provided with a tracing wheel 50. This tracing wheel is hingedly supported at 51 and is kept in bearing contact with the pavement 52 by means of a helical spring 53.

The spraying mechanism of my device comprises a spray nozzle 58 and other details which are not shown and described in this application but which are clearly shown and described in my pending applications Serial Nos. 327,487 and 329,930 filed, respectively, April 2, 1940, and April 16, 1940.

From the foregoing it will be obvious that the front supporting wheels of the vehicle are steered by means of the steering wheel 43 and, since the indicating boom 44 is directly connected to the steering means of the vehicle, the tracing wheel carried by the boom may be accurately kept upon the predetermined line on the pavement and the steering means thereby accurately controlled because of the magnifying action of the boom, whereby to anticipate the path of the paint spraying device. In this form of my device the steering lever 30 through the medium of the drag link 31, adjustable steering arm 32 and steering knuckle arm 33 will cause the front supporting wheels 14 to be steered in accordance with the movement of the indicating boom. Since the boom extends forwardly a considerable distance beyond the steering shaft 22, only a slight rotary movement of the steering shaft will be brought about even with considerable lateral displacement of the tracing wheel 50. This rotative movement of the steering shaft is further reduced by reason of the fact that the length of the steering lever 30 is shorter than the total length of the adjustable steering arm 32 and the steering knuckle arm 33. Due to this linkage arrangement the movement of the tracing wheel is greatly reduced in the movement of the front supporting wheels 14 of the vehicle so that steering may be accurately controlled and the vehicle thereby maintained in the proper position for the application of the stripe, using the stripe previously painted or predetermined marks made upon the pavement as a guide. Since the rod 45 is arranged in a horizontal plane, it will be obvious that the boom may be raised vertically when not in use or when it is desired to raise the guide wheel temporarily from contact with the pavement.

Referring now particularly to the form of invention shown in Figs. 4 and 5, 49 represents a truck of any suitable type which is used to draw the paint striping device 55 attached to the rear of the truck and comprising a spray nozzle 59 and other details shown and described in said pending applications. This form of device is provided with an indicating boom 56 having a tracing wheel 57 at its forward end. The boom in this form of invention comprises a front member 60 and a rear member 61. These members are pivotally attached by means of a pin 62 which lies in a horizontal plane whereby the front member 60 may be elevated if desired. The rear end of the rear member is pivotally attached to a boom bracket 63 by means of a vertically arranged pivot pin 64. The bracket is carried by the axle 65 and is preferably attached thereto by means of a clamp plate 66 and bolts 67, whereby my device may be attached to the truck without alteration thereof. The front supporting wheels 70 of the truck are mounted upon steering knuckles 71, as is customary, which are connected together by means of a connecting rod 72, one of the knuckles being connected to the steering mechanism of the truck (not shown) by means of the drag link 73. The steering knuckle 71 at one side of the device is provided with a forwardly extending steering arm 74, which is clamped to the steering knuckle in any suitable manner whereby the arm will be moved as the steering knuckle is moved. The arm extends forwardly a considerable distance and is connected to an adjustable pin 75 carried by the rear member 61 of the boom by means of a link 80. The pin is mounted within a slot 81 formed in the rear member of the boom and is provided with means (not shown) for clamping the same in position, whereby the length of the lever formed by the rear member between its pivot pin 64 and the pin 75 may be adjusted so as to alter the ratio of movement between the boom and the front supporting wheels of the vehicle.

From the foregoing it will be obvious that in this form of the invention the boom is moved through the medium of the regular steering mechanism of the truck. However, since the tracing wheel carried by the boom may be kept laterally in registration with the old stripe or the predetermined markings on the road by means of the steering mechanism of the truck, the tracing wheel will, therefore, anticipate the position of the paint spraying device and the operator can be assured that the stripe will be painted in the proper place (after the machine has once been properly adjusted) whether the line is straight or curved.

It is well known that the greatest difficulty in registering lines is experienced when rounding curves. Particularly is this so with the truck type shown in Figs. 4 and 5. However, when once adjusted to the wheel base of the truck, the distance between the paint striping device and the rear axle of the truck, the distance between the paint striping device and the front supporting wheels of the pushmobile type, and other factors which enter into the steering, my device will enable the operator to steer the truck in such manner that he will be assured that the stripe applied by the painting device will be in proper registration. If the newly applied stripe does not register at a curve, the steering arm 32 in the pushmobile type or the link 80 of the truck type may be adjusted to bring about the desired results. It is obvious that the greater the distance between the painting device and the front supporting wheels of the vehicle, the greater will be the offset of the vehicle as it is rounding a curve. However, the adjustments mentioned make it possible to adjust either form of device so that the proper steering ratio may be brought about, after which the device operates without further adjustment.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. A road striping machine, comprising laterally spaced front supporting wheels, and laterally spaced rear supporting wheels, paint spraying means disposed behind said front wheels and along a longitudinal axis disposed intermediately of said laterally spaced wheels, manual steering means for said front wheels, a tracing element disposed substantially forwardly of said front wheels for movement along the same path as the paint spraying means and actuated by said steering means, and linkage between said steering means and said tracing element, whereby angular deviations of said tracing element caused by the movements of said steering means are greatly increased relatively to the movements of said steering means to cause the tracing element to accurately anticipate the path of the paint spraying means.

2. A road striping machine, comprising laterally spaced front supporting wheels, and laterally spaced rear supporting wheels, paint spraying means disposed behind said front wheels and along a longitudinal axis disposed intermediately of said laterally spaced wheels, manual steering means for said front wheels, a guiding boom pivotally carried by said machine and disposed substantially forwardly of said front supporting wheels for movement along the same path as the paint spraying means, a tracing element carried at the forward end of the boom, a lever associated with said boom, said lever being relatively shorter than said boom, a steering arm carried by said steering means, and a link connecting said lever and said arm, whereby angular variations of said tracing element caused by the movements of said steering means are greatly increased relatively to the movements of said steering means to cause the boom to accurately anticipate the path of the paint spraying means.

3. A road striping machine, comprising laterally spaced front supporting wheels, and laterally spaced rear supporting wheels, paint spraying means disposed behind said front wheels and along a longitudinal axis disposed intermediately of said laterally spaced wheels, manual steering means for said front wheels, a guiding boom pivotally carried by said machine and disposed substantially forwardly of said front supporting wheels for movement along the same path as the paint spraying means, a tracing element carried at the forward end of the boom, a lever associated with said boom, said lever being relatively shorter than said boom, a steering arm carried by said steering means, a link connecting said lever and said arm, and longitudinally movable means for adjusting the relative lengths of said lever and said arm, whereby angular variations of said tracing element caused by the movements of said steering means are greatly increased relatively to the movements of said steering means to cause the boom to accurately anticipate the path of the paint spraying means.

4. A road striping machine, comprising laterally spaced front supporting wheels, and laterally spaced rear supporting wheels, paint spraying means disposed behind said front wheels and along a longitudinal axis disposed intermediately of said laterally spaced wheels, manual steering means for said front wheels, a guiding boom pivotally carried by said machine and disposed substantially forwardly of said front supporting wheels for movment along the same path as the paint spraying means, said boom being made in two sections joined by a horizontal pivotal connection, a tracing element carried at the outer end of said boom, a steering arm carried by said steering means, and a link connecting said boom with said arm, whereby angular deviations of said tracing element caused by the movements of said steering means are greatly increased relatively to the movements of the steering means to cause the boom to accurately anticipate the path of the paint spraying means.

5. Means for guiding a vehicle steering mechanism over a roadway, comprising a tracing element extending foarwardly of the steering mechanism, said tracing element being supported by said roadway and when steering being in substantially the same plane as the vehicle wheels, manually operable means permanently connected directly to said steering mechanism for moving said element over said roadway, linkage non-resiliently connecting said steering mechanism to said element to positively actuate the latter and adjustable means carried by said linkage for changing the ratio of movement between said element and the steering mechanism, whereby the tracing element is steered by the steering mechanism and angular variations of movement of said element are greatly increased relatively to the movement of said steering mechanism.

6. Means for guiding a vehicle steering mechanism over a roadway, comprising an indicating boom extending forwardly of the steering mechanism, a tracing element carried at the forward end of said boom, said tracing element being supported by said roadway and when steering being in substantially the same plane as the vehicle wheels, manually operable means permanently connected directly to said steering mechanism for moving said element over said roadway, linkage non-resiliently connecting said steering mechanism to said boom to positively actuate the latter, and adjustable means carried by said linkage for changing the ratio of movement between said boom and said steering mechanism, whereby the tracing element is steered by the steering mechanism and angular variations of movement of said element are greatly increased relatively to the movement of said steering mechanism.

7. Means for guiding a vehicle steering mechanism over a roadway, comprising a pivotally mounted indicating boom extending forwardly of the steering mechanism, a tracing element carried at the forward end of said boom, said tracing element being supported by said roadway and when steering being in substantially the same plane as the vehicle wheels, manually operable means permanently connected directly to said steering mechanism for moving said element over said roadway, a lever associated with said boom, said lever being relatively shorter than said boom, and a link non-resiliently connecting said lever and said steering mechanism, whereby the tracing element is steered by the steering mechanism and angular variations of movement of said element are greatly increased relatively to the movement of said steering mechanism.

8. Means for guiding a vehicle steering mechanism over a roadway, comprising a pivotally mounted indicating boom extending forwardly of the steering mechanism, a tracing element carried at the forward end of said boom, said tracing element being supported by said roadway and when steering being in substantially the same plane as the vehicle wheels, manually operable means permanently connected directly to said steering mechanism for moving said element over said roadway, a lever associated with said boom, said lever being relatively shorter than said boom, a link non-resiliently connecting said lever and said steering mechanism, and longitudinally movable means for adjusting the ratio of movement between said lever and said steering mechanism, whereby the tracing element is steered by the steering mechanism and angular variations of movement of said element are greatly increased relatively to the movement of said steering mechanism.

IRA H. BEAMAN.